United States Patent
Osawa

(10) Patent No.: US 10,746,528 B2
(45) Date of Patent: Aug. 18, 2020

(54) OPTICAL IMAGE MEASUREMENT APPARATUS AND OPTICAL IMAGE MEASUREMENT METHOD

(71) Applicant: Hitachi-LG Data Storage, Inc., Tokyo (JP)

(72) Inventor: Kentaro Osawa, Tokyo (JP)

(73) Assignee: HITACHI-LG DATA STORAGE, INC., Tokyo (JP)

(*) Notice: Subject to any disclaimer, the term of this patent is extended or adjusted under 35 U.S.C. 154(b) by 130 days.

(21) Appl. No.: 15/784,383

(22) Filed: Oct. 16, 2017

(65) Prior Publication Data
US 2018/0120084 A1 May 3, 2018

(30) Foreign Application Priority Data
Oct. 27, 2016 (JP) .................. 2016-210709

(51) Int. Cl.
*G01B 9/02* (2006.01)
*G01N 21/23* (2006.01)

(52) U.S. Cl.
CPC ...... *G01B 9/02011* (2013.01); *G01B 9/02041* (2013.01); *G01B 9/02091* (2013.01); *G01N 21/23* (2013.01); *G01B 2290/45* (2013.01); *G01B 2290/70* (2013.01)

(58) Field of Classification Search
CPC ........... G01B 9/02007; G01B 9/02011; G01B 9/02041; G01B 9/02091; G01B 2290/45; G01B 2290/70
See application file for complete search history.

(56) References Cited

U.S. PATENT DOCUMENTS

| 2008/0285043 | A1* | 11/2008 | Fercher | A61B 3/102 356/451 |
| 2012/0099113 | A1* | 4/2012 | de Boer | A61B 5/0066 356/491 |
| 2013/0100456 | A1 | 4/2013 | Yu et al. | |
| 2014/0152996 | A1* | 6/2014 | Osawa | G01B 9/02091 356/479 |

(Continued)

FOREIGN PATENT DOCUMENTS

| JP | 2004-028970 A | 1/2004 |
| JP | 2007-298461 A | 11/2007 |

(Continued)

OTHER PUBLICATIONS

Japanese Office Action received in corresponding Japanese Application No. 2016-210709 dated Nov. 26, 2019.

*Primary Examiner* — Michael A Lyons
(74) *Attorney, Agent, or Firm* — Mattingly & Malur, PC

(57) ABSTRACT

Exemplary embodiments relate to providing an optical image measurement apparatus that is capable of acquiring information on birefringence of a sample while suppressing size and cost of the apparatus. In the present disclosure: second measurement light different from first measurement light is generated using a passive optical element that generates light of second polarization state different from first polarization state; a time when the first measurement light is irradiated onto a sample is adjusted at a first time, and a time when the second measurement light is irradiated onto the sample is adjusted at a second time different from the first time.

9 Claims, 8 Drawing Sheets

(56) References Cited

U.S. PATENT DOCUMENTS

| | | | |
|---|---|---|---|
| 2014/0204388 A1* | 7/2014 | Osawa | G01B 9/02091 356/479 |
| 2014/0204389 A1* | 7/2014 | Mukoh | G01B 9/02091 356/479 |
| 2015/0062589 A1* | 3/2015 | Osawa | G01B 9/02038 356/479 |
| 2016/0054113 A1 | 2/2016 | Osawa et al. | |

FOREIGN PATENT DOCUMENTS

| | | |
|---|---|---|
| JP | 2010-117372 A | 5/2010 |
| JP | 2016-44999 A | 4/2016 |

\* cited by examiner

FIG. 3(A) focal position x of objective lens (long time scale)
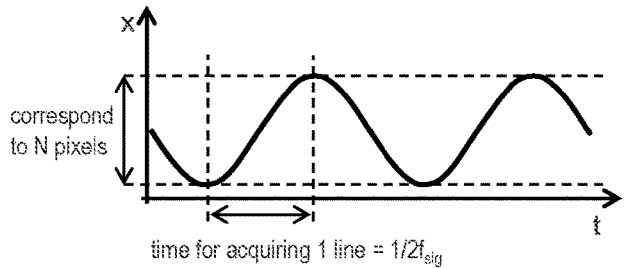
FIG. 3(B) focal position x of objective lens (short time scale)
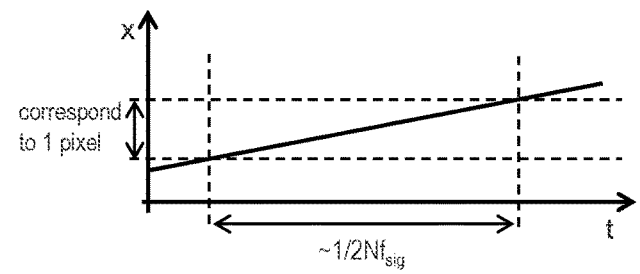
FIG. 3(C) example of irradiation timing of measurement light
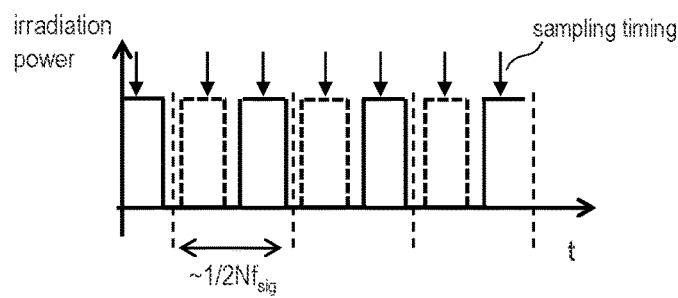
FIG. 3(D) example of irradiation timing of measurement light
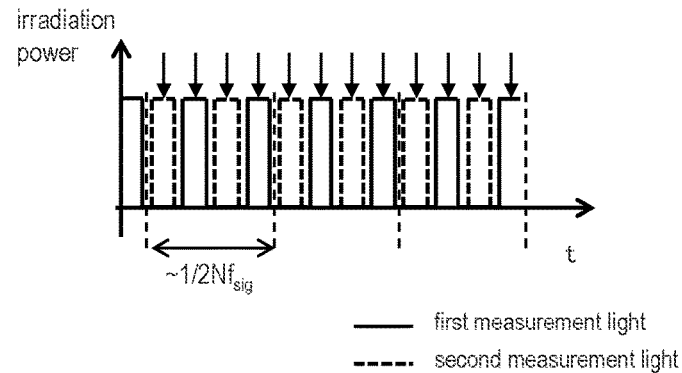

OPTICAL IMAGE MEASUREMENT APPARATUS AND OPTICAL IMAGE MEASUREMENT METHOD

CROSS REFERENCE TO RELATED APPLICATIONS

The present application claims priority from Japanese patent application JP 2016-210709 filed on Oct. 27, 2016, the content of which is hereby incorporated by reference into this application.

BACKGROUND

Technical Field

The present disclosure relates to a technique for observing samples using light.

Background Art

Optical Coherence Tomography (OCT) is a technique that acquires tomographic images of samples using interference of light. OCT has been in practical use from the year 1996 in the field of funduscopy. In recent years, it has been studied to apply OCT into various fields such as cardiology, odontology, oncology, food industry, or regenerative medicine.

In OCT technology, light from a light source is divided into two light, i.e. signal light that is irradiated onto the sample and reference light that is reflected by a reference light mirror. Measurement signals are acquired by causing the signal light reflected from the sample to be multiplexed with the reference light to interfere with each other.

OCT is generally categorized into time domain OCT and Fourier domain OCT depending on the scanning method (hereinafter, referred to as z scan) in the optical axis direction at the measured position. In time domain OCT, low coherence light source is used as the light source. Z scan is performed by scanning the reference light mirror during measurement. Then only the components in the signal light whose optical path length is identical to that of the reference light interfere with the reference light. Signals are demodulated by performing envelope demodulation to the acquired interference signals. Fourier domain OCT is further categorized into swept source OCT and spectrum domain OCT. In swept source OCT, wavelength-swept light source is used that is capable of scanning the wavelength of the emitted light. Z scan is performed by scanning the wavelength during measurement. Signals are demodulated by performing Fourier conversion to wavelength dependency (interference spectrum) of the detected interference light intensity. In spectrum domain OCT, broadband light source is used. Z scan corresponds to dispersing the generated interference light by spectroscope and detecting interference light intensity (interference spectrum) for each wavelength component. Signals are demodulated by performing Fourier conversion to the acquired interference spectrum.

It is commonly known that: some of biological tissues measured by OCT, such as collagen included in human skins or crystalline lens of human eyeballs, have birefringence. It is possible to acquire various information of the sample if such birefringence is visualized. However, typical OCT that measures reflectance distribution cannot visualize birefringence. Polarization sensitive OCT has been developed as a technique for visualizing birefringence (Patent Document 1).

Patent Document 2 listed below describes a technique that acquires Jones vector of the sample by rapidly modulating polarization states of incident beams using an EO (Electro Optical) modulator.

RELATED ART DOCUMENTS

Patent Documents

Patent Document 1: JP Patent Publication (Kokai) 2004-028970 A
Patent Document 2: JP Patent Publication (Kokai) 2007-298461 A

SUMMARY

In conventional polarization sensitive OCT apparatuses such as those described in Patent Document 1, in order to acquire information on birefringence of the sample (such as Jones matrix or Mueller matrix), it is necessary to perform scanning (measurement) while varying the polarization state of the measurement light incident on the sample and the polarization state of the reference light. If those matrixes are formed with four elements and each element is described with complex numbers, one measurement is performed for each of the real component and the imaginary component in each element. Thus it is necessary to perform such measurement at least eight times for acquiring all elements.

The polarization sensitive optical image measurement apparatus described in Patent Document 2 attempts to acquire Jones vector of the sample by a single scan using an EO modulator. However, typical EO modulators are large and expensive. Thus it results in increased size and cost of the apparatus.

Exemplary embodiments relate to providing an optical image measurement apparatus that is capable of acquiring information on birefringence of a sample while suppressing size and cost of the apparatus.

In the present disclosure: second measurement light different from first measurement light is generated using a passive optical element that generates light of second polarization state different from first polarization state; a time when the first measurement light is irradiated onto a sample is adjusted at a first time, and a time when the second measurement light is irradiated onto the sample is adjusted at a second time different from the first time. First and second signal light that are acquired from the sample reflecting or scattering the first and the second measurement light are detected and then are outputted in a form of an electric signal. Thereby it is possible to acquire information corresponding to different polarization states simultaneously by a single scan. Accordingly, it is possible to acquire more information on birefringence of the sample than conventional techniques with inexpensive and simple configurations. The passive optical element is an optical element that does not require some electrical/magnetic/mechanical controls for performing the element's functionalities.

An example of the present disclosure includes a light shield that shields the first and the second measurement light. A time when the light shield shields the first measurement light and a time when the light shield shields the second measurement light are adjusted, thereby the first and the second times are adjusted. Since the light shield controls irradiation timings of the measurement light, it is beneficial in that it is not necessary to provide multiple light sources for generating the first and the second measurement light.

An example of the present disclosure includes a first and a second light sources. Light emitted from the first light source is irradiated onto the sample as the first measurement light, and light emitted from the second light source is irradiated onto the sample as the second measurement light. A time when the first light source emits light and a time when the second light source emits light are controlled, thereby the first and the second times are controlled. Since the irradiation timing of the measurement light may be controlled by controlling the light-emitting timings of the light sources, it is possible to rapidly control the irradiation timings with simple configurations.

An example of the present disclosure splits the first signal light into a component in a third polarization state and a component in a fourth polarization state, and splits the second signal light into a component in the third polarization state and a component in the fourth polarization state. The components of the first signal light in the third and the fourth polarization states are each detected, and the components of the second signal light in the third and the fourth polarization states are each detected. Thereby it is possible to acquire further more information on birefringence of the sample by a single scan. The third and the fourth polarization states may be identical to or different from the first and the second polarization states.

An example of the present disclosure divides light emitted from the light source to generate the first and the second measurement light and first and second reference light. The first signal light is multiplexed with the first reference light to generate three or more of interference light whose phases are different from each other, and the second signal light is multiplexed with the second reference light to generate three or more of interference lights whose phases are different from each other. These interference light are detected to be outputted in a form of electric signal. Thereby it is possible to acquire phase information of the first and the second signal light. Accordingly, it is possible to acquire further more information of birefringence of the sample by a single scan.

An example of the present disclosure multiplexes the first signal light with the first reference light to generate first and second multiplexed light, and multiplexes the second signal light with the second reference light to generate third and fourth multiplexed light. An angle at which the first multiplexed light enters the interference optical system is configured to be different from an angle at which the second multiplexed light enters the interference optical system, and an angle at which the third multiplexed light enters the interference optical system is configured to be different from an angle at which the fourth multiplexed light enters the interference optical system. Thereby it is possible to share the interference optical system. Thus it is possible to decrease size and cost of the apparatus.

An example of the present disclosure scans the first and the second measurement light in a certain direction. Assuming that a number of pixels of an image of the sample is N, an operation irradiating the first measurement light onto the sample and an operation irradiating the second measurement light onto the sample are switched between each other at a frequency equal to or above N times of a frequency at which the light irradiator scans the first and the second measurement light. Thereby it is possible to sample signals sufficient to generate images with N pixels for each of the first and the second signal light.

An example of the present disclosure scans the first and the second measurement light in a certain direction. Assuming that a number of pixels of an image of the sample is N, an operation irradiating the first measurement light onto the sample and an operation irradiating the second measurement light onto the sample are switched between each other at a frequency approximately equal to or above N times and approximately equal to or below 2N times of a frequency at which the light irradiator scans the first and the second measurement light. Thereby it is possible to sample signals sufficient to generate images with N pixels for each of the first and the second signal light, without using elements and devices whose performances are unnecessarily high, as means for differentiating the timing when the first measurement light is irradiated onto the sample from the timing when the second measurement light is irradiated onto the sample.

With the present disclosure, it is possible to acquire information on birefringence of the sample by performing fewer scans than conventional techniques, or to acquire more information on birefringence of the sample than conventional techniques by performing a single scan. Technical problems, configurations, and effects other than mentioned above will be apparent from the descriptions of embodiments below.

BRIEF DESCRIPTION OF THE DRAWINGS

FIG. 3(a)-FIG. 3(d) are diagrams illustrating a time scale of movement of focus position of an objective lens 108 (irradiation position of measurement light) and a time scale of irradiation timing of a first and a second measurement light by the light shielding element 105.

DETAILED DESCRIPTION

Embodiment 1: Configuration of Optical System

Figure 1:
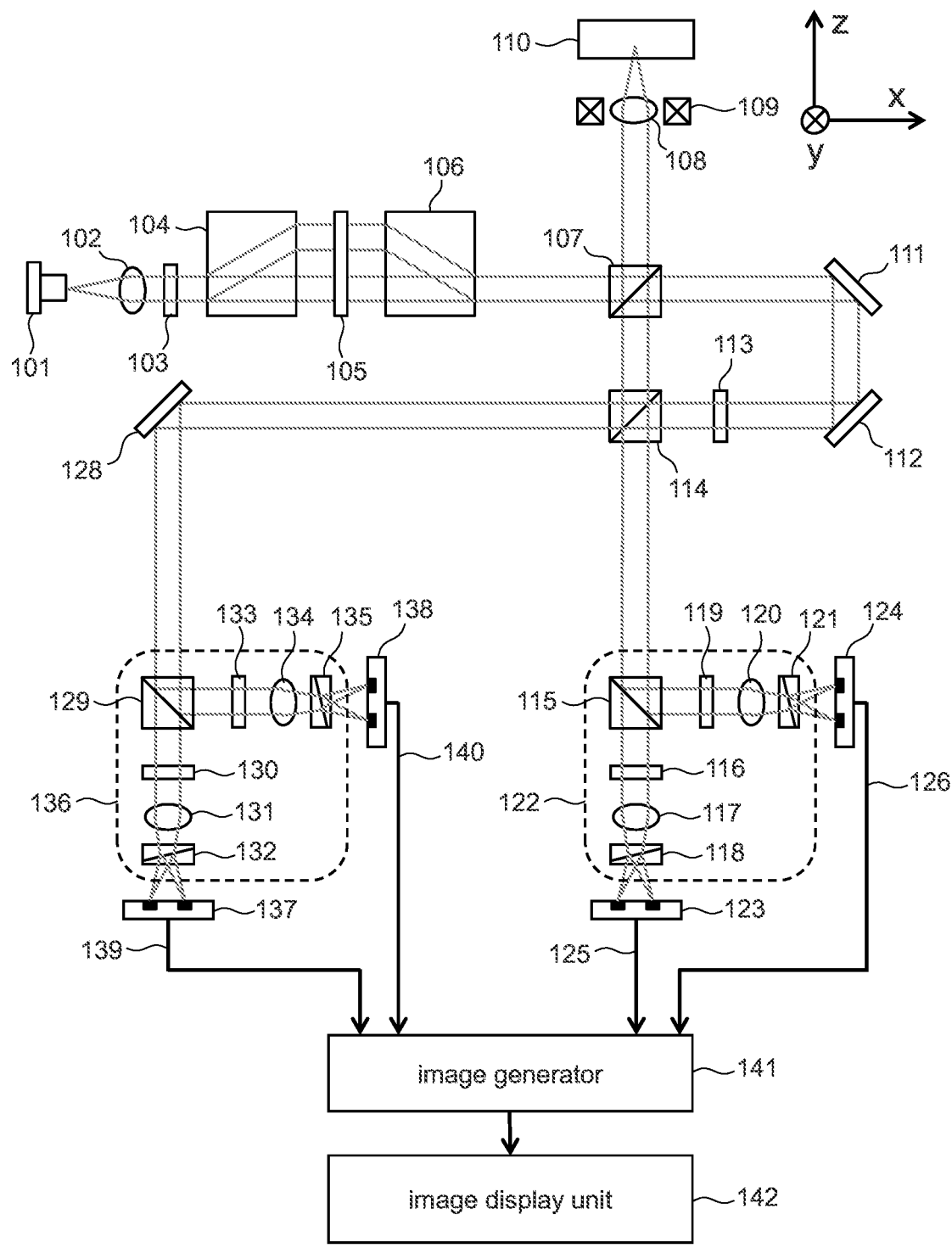
FIG. 1 is a schematic diagram illustrating a configuration example of an optical image measurement apparatus according to an embodiment 1.

FIG. 1 is a schematic diagram illustrating a configuration example of an optical image measurement apparatus according to an embodiment 1 of this disclosure. Laser light emitted from a light source 101 is converted into parallel light by a collimate lens 102. The polarization of the parallel light is adjusted into 45 degree linear polarization by a λ/2 plate 103 whose optical axis is set at approximately 22.5 degree with respect to the horizontal direction. The parallel light is divided in the polarization by a beam displacer 104 into first laser light as P polarization component and into second laser light as S polarization component. The light intensity ratio of each component is 1:1. The first and the second laser light are shielded at predetermined timings by a light shielding element 105. The first and the second light are multiplexed by a beam displacer 106. The multiplexed light enters a half beam splitter 107. The light shielding element 105 is configured to let the first and the second light pass through the light shielding element 105 alternately. A configuration example of the light shielding element 105 will be described later.

The first laser light is divided into first measurement light and first reference light by the half beam splitter 107. The second laser light is divided into second measurement light and second reference light by the half beam splitter 107.

The first measurement light in P polarization state and the second measurement light in S polarization state are focused and irradiated onto a sample 110 by an objective lens 108. The position of the objective lens 108 is repetitively moved by an objective lens actuator 109 in sign wave form at frequency $f_{sig}$ in the x axis direction, and is moved linearly in the y axis direction, for example. Thereby the irradiation position of measurement light (focused position) is scanned in xy directions. The relationship between scan frequency and light shielding frequency will be described later using FIG. 3.

Any object could be the sample 110 as long as it is desired to observe the internal structure of the object noninvasively, specifically as long as it is desired to observe birefringence structure. Examples of such object may be food, plant, cultured cell, human tissue, and the like. First and second signal light are acquired from the sample 110 when the first and the second measurement light are reflected or scattered at the sample 110. The first and the second signal light pass through the objective lens 108 and the half beam splitter 107, and then enter a polarization beam splitter 114. The first and the second signal light signal light may include both P polarization component and S polarization component regardless of the polarization state of the first and the second measurement light.

The first reference light in P polarization state and the second reference light in S polarization state are reflected by mirrors 111 and 112. The polarization states of the first and the second reference light are converted into 45 degree linear polarization and −45 degree linear polarization respectively by a $\lambda/2$ plate 113, whose optical axis direction is set at approximately 22.5 degree with respect to the horizontal direction. The first and the second reference light are guided to the polarization beam splitter 114. Due to 45 degree polarization, the light after passing through the $\lambda/2$ plate 113 includes both P polarization component and S polarization component.

The P polarization component of the first signal light when entering the polarization beam splitter 114 is multiplexed with the S polarization component of the first reference light by the polarization beam splitter 114, thereby first multiplexed light is generated to enter a first interference optical system 122. The S polarization component of the first signal light when entering the polarization beam splitter 114 is multiplexed with the P polarization component of the first reference light by the polarization beam splitter 114, thereby second multiplexed light is generated to be reflected by a mirror 128. Then the second multiplexed light enters a second interference optical system 136. The configurations of the first interference optical system 122 and of the second interference optical system 136 are identical to each other. Thus the configuration of the first interference optical system 122 will be mainly described below.

The first multiplexed light that enters the first interference optical system 122 is divided into transmitted light and reflected light by a half beam splitter 115. The transmitted light of the first multiplexed light transmits a $\lambda/2$ plate 116 whose optical axis is set at approximately 22.5 degree with respect to the horizontal direction. The transmitted light is focused by a focus lens 117 and is divided into two beams by a Wollaston prism 118. Thereby first and second interference light are generated whose phases are different from each other by 180 degree. A current differential optical detector 123 detects the first and the second interference light, and outputs a signal 125 which is proportional to the intensity difference between the first and the second interference light.

The reflected light of the first multiplexed light transmits a $\lambda/4$ plate 119 whose optical axis is set at approximately 45 degree with respect to the horizontal axis. The reflected light is focused by a focus lens 120 and is divided into two beams by a Wollaston prism 121. Thereby third and fourth interference light are generated whose phases are different from each other by 180 degree. A current differential optical detector 124 detects the third and the fourth interference light, and outputs a signal 126 which is proportional to the intensity difference between the third and the fourth interference light.

Similarly the second interference optical system 136 generates four interference light from the second multiplexed light. Current differential optical detectors 137 and 138 detect these interference light and generate signals 139 and 140.

The P polarization component of the second signal light when entering the polarization beam splitter 114 is multiplexed with the S polarization component of the second reference light by the polarization beam splitter 114, thereby third multiplexed light is generated to enter the first interference optical system 122. The S polarization component of the second signal light when entering the polarization beam splitter 114 is multiplexed with the P polarization component of the second reference light by the polarization beam splitter 114, thereby fourth multiplexed light is generated to be reflected by the mirror 128. Then the fourth multiplexed light enters the second interference optical system 136.

Similarly to the first and the second multiplexed light, the third and the fourth multiplexed light are converted into four interference light by the first interference optical system 122 and the second interference optical system 136 to be detected. The light shielding element 105 always shields one of the first or the second laser light. Thus the timing at which the first and the second multiplexed light are converted into four interference light to be detected is different from the timing at which the third and the fourth multiplexed light are converted into four interference light to be detected.

The signals 125, 126, 139, and 140 are inputted into an image generator 141. According to the signals 125, 126, 139, and 140, the image generator 141 generates images that reflects information on reflectance and birefringence of the sample 110, and displays the images on an image display unit 142. The images displayed by the image display unit 142 includes such as: an image corresponding to absolute values of each element in Jones matrix of the sample; or an image corresponding to the phase difference between P polarization and S polarization of the signal light generated from the sample 110.

The spatial resolution in the optical axis direction of the optical image measurement apparatus according to the embodiment 1 will be described below. In the embodiment 1, the reflected light component included in the signal light from portions other than the focal point of the objective lens 108 has defocus aberration. Thus wavefront shapes of such reflected light components do not match with that of the reference light whose wavefront is planar. Accordingly, such reflected light components do not evenly interfere with the reference light, and thus many interference fringes are formed on the light receiving surface of the detector. When such interference fringes are formed, the integrated value of the intensity of the detected interference light integrated in the light receiving surface will be approximately same as a simple summation of intensities of the signal light and the reference light. Thus components of signals 125, 126, 139, and 140 corresponding to the reflected light components from portions other than the focal point of the objective lens 108 will be approximately 0. According to such theory, the reflected light components from portions other than the focal point of the objective lens 108 will not be effectively interfered with the reference light. Thus only the reflected light component from the focal point of the objective lens 108 will be selectively detected, thereby achieving high spatial resolution in the optical axis direction. The spatial resolution in the optical axis direction is determined by numerical aperture NA of the objective lens and wavelength $\lambda$ of the laser light. The spatial resolution is proportional to $\lambda/NA^2$. Typically, the wavelength of light utilized in OCT apparatuses is approximately from 600 nm to 1300 nm which is not easily absorbed by hemoglobin or water. If the numerical aperture of the objective lens 108 is more than 0.4, for example, the spatial resolution in the optical axis direction at wavelength 600 nm-1300 nm is within approximately 3.3 μm-7.2 μm.

Figure 2:
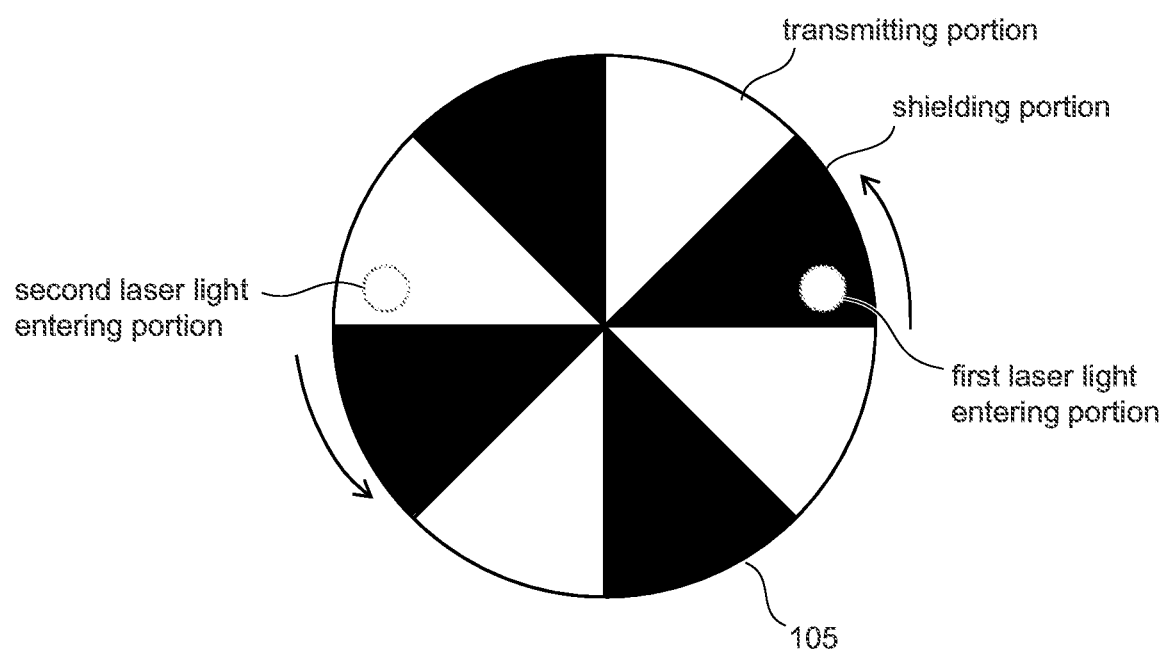
FIG. 2 is a front view of a structural example of a light shielding element 105.

FIG. 2 is a front view illustrating a structural example of the light shielding element 105. The light shielding element 105 has a structure in which a light transmitting portion and a light shielding portion are provided alternately along a rotational direction of a disk. By rotating the disk, the first and the second light are shielded alternately and periodically, thereby always only one of the first and the second laser light is guided toward the beam displacer 106.

FIG. 3(a)-FIG. 3(d) are diagrams illustrating a time scale of movement of focus position (irradiation position of measurement light) of the objective lens 108 and a time scale of irradiation timing of the first and the second measurement light by the light shielding element 105. As shown in FIG. 3 (a), the time required for the objective lens actuator 109 to move the focus point of the objective lens 108 by a distance corresponding to one line of the image is $1/2f_{sig}$. Accordingly, assuming that the number of pixels of the image of the sample 110 acquired by the optical image measurement apparatus of the embodiment 1 is N×N, the time required for the focus point of the objective lens 108 to move by a distance corresponding to one pixel is $1/2Nf_{sig}$ in average (FIG. 3 (b)). In the embodiment 1, while the focus point of the objective lens 108 moves by a distance corresponding to one pixel (during a time of $1/2Nf_{sig}$ in average), the light shielding element 105 switches whether transmitting (or shielding) the first or the second laser light at least once. In other words, the light shielding element 105 shields the first and the second laser light alternately at least by a frequency at or above $2Nf_{sig}$. Thereby as shown in FIG. 3 (c), for example, while the focus position of the objective lens 108 moves by one pixel, it is possible to irradiate the first and the second measurement light onto the sample. Therefore, it is possible to sample signals which are sufficient to generate an image with N pixels for each of the first and the second measurement light.

The timings at which the first and the second measurement light are irradiated onto the sample 110 may be any timings as long as the first and the second measurement light are irradiated onto the sample 110 at least once while the focus position of the objective lens 108 moves by one pixel. Any cases are conceivable such as: the first and the second measurement light are each irradiated once while the focus position of the objective lens 108 moves by one pixel, as shown in FIG. 3 (c); the first and the second measurement light are each irradiated twice as shown in FIG. 3 (d); and the like.

On the other hand, if the frequency at which the first and the second laser light are shielded alternately is increased too much, it is necessary for the light shielding element 105 and the optical detectors 123, 124, 137, and 138 to have high capabilities (rapidity). Thus the cost is increased. Accordingly, it is preferable that the frequency at which the first and the second laser light are shielded alternately is not unnecessarily increased. For example, the frequency is preferably within the range of approximately $2Nf_{sig}$ to $4Nf_{sig}$.

Embodiment 1: Operation Theory of Optical System

Hereinafter, the operation theory and the effect of the optical image measurement apparatus according to the embodiment 1 will be described in details using equations. The Jones matrix of the sample and the Jones vectors of the first and the second measurement light are described by Equations 1-3 below.

[Equation 1]

$$R = \begin{pmatrix} r_{pp} & r_{ps} \\ r_{sp} & r_{ss} \end{pmatrix} \quad (1)$$

[Equation 2]

$$E_{prob,1} = \sqrt{2} \begin{pmatrix} E_{prob} \\ 0 \end{pmatrix} \quad (2)$$

[Equation 3]

$$E_{prob,2} = \sqrt{2} \begin{pmatrix} 0 \\ E_{prob} \end{pmatrix} \quad (3)$$

The Jones vectors of the first and the second signal light after passing through the polarization beam splitter 114 are described by Equations 4 and 5 below.

[Equation 4]

$$E_{sig,1} = \begin{pmatrix} r_{pp} \\ r_{sp} \end{pmatrix} E_{prob} \quad (4)$$

[Equation 5]

$$E_{sig,2} = \begin{pmatrix} r_{ps} \\ r_{ss} \end{pmatrix} E_{prob} \quad (5)$$

If the Jones vectors of the first and the second reference light are described by Equations 6 and 7 below, the Jones vectors of the first to fourth multiplexed light are given by Equations 8-11 below.

[Equation 6]

$$E_{ref,1} = \begin{pmatrix} 1 \\ 1 \end{pmatrix} E_{ref} \qquad (6)$$

[Equation 7]

$$E_{ref,2} = \begin{pmatrix} 1 \\ -1 \end{pmatrix} E_{ref} \qquad (7)$$

[Equation 8]

$$E_1 = \begin{pmatrix} r_{pp} E_{prob} \\ E_{ref} \end{pmatrix} \qquad (8)$$

[Equation 9]

$$E_2 = \begin{pmatrix} E_{ref} \\ r_{sp} E_{prob} \end{pmatrix} \qquad (9)$$

[Equation 10]

$$E_3 = \begin{pmatrix} r_{ps} E_{prob} \\ -E_{ref} \end{pmatrix} \qquad (10)$$

[Equation 11]

$$E_4 = \begin{pmatrix} E_{ref} \\ r_{ss} E_{prob} \end{pmatrix} \qquad (11)$$

Regarding the first multiplexed light entering the first interference optical system, the Jones vector of the multiplexed light transmitting the polarization beam splitter 114 and further transmitting the λ/2 plate 116 is described by Equation 12 below.

[Equation 12]

$$\begin{pmatrix} 1/\sqrt{2} & 1/\sqrt{2} \\ 1/\sqrt{2} & -1/\sqrt{2} \end{pmatrix} \begin{pmatrix} r_{pp} E_{prob}/\sqrt{2} \\ E_{ref}/\sqrt{2} \end{pmatrix} = \frac{1}{2} \begin{pmatrix} r_{pp} E_{prob} + E_{ref} \\ r_{pp} E_{prob} - E_{ref} \end{pmatrix} \qquad (12)$$

The multiplexed light described by Equation 12 is detected differentially by the current differential optical detector 123 after the Wollaston prism 118 separates the polarization of the multiplexed light into P polarization and S polarization. Thus the signal 125 corresponding to the first multiplexed light is described by Equation 13 below. $\theta_{pp}$ is a phase of $r_{pp}$. $\varphi$ is a phase difference between $E_{prob}$ and $E_{ref}$. For the sake of simplicity, the conversion efficiency of the detector 123 is assumed as 1.

[Equation 13]

$$I_1 = \frac{1}{4}|r_{pp} E_{prob} + E_{ref}|^2 - \frac{1}{4}|r_{pp} E_{prob} - E_{ref}|^2 = \qquad (13)$$
$$|r_{pp}||E_{prob}||E_{ref}|\cos(\theta_{pp} + \phi)$$

The Jones vector of the multiplexed light reflected by the polarization beam splitter 114 and further transmitting the λ/4 plate 119 is described by Equation 14 below.

[Equation 14]

$$\begin{pmatrix} 1/\sqrt{2} & i/\sqrt{2} \\ i/\sqrt{2} & 1/\sqrt{2} \end{pmatrix} \begin{pmatrix} r_{pp} E_{prob}/\sqrt{2} \\ E_{ref}/\sqrt{2} \end{pmatrix} = \frac{1}{2} \begin{pmatrix} r_{pp} E_{prob} + iE_{ref} \\ i(r_{pp} E_{prob} - iE_{ref}) \end{pmatrix} \qquad (14)$$

The multiplexed light described by Equation 14 is detected differentially by the current differential optical detector 124 after the Wollaston prism 121 separates the polarization of the multiplexed light into P polarization and S polarization. Thus the signal 126 corresponding to the first multiplexed light is described by Equation 15 below.

[Equation 15]

$$Q_1 = \frac{1}{4}|r_{pp} E_{prob} + iE_{ref}|^2 - \frac{1}{4}|r_{pp} E_{prob} - iE_{ref}|^2 = \qquad (15)$$
$$|r_{pp}||E_{prob}||E_{ref}|\sin(\theta_{pp} + \phi)$$

Similarly, the differential detection signals corresponding to the second to fourth multiplexed light are described by Equations 16-21 respectively.

[Equation 16]

$$I_2 = |r_{sp}||E_{prob}||E_{ref}| \cos(\theta_{sp}+\phi) \qquad (16)$$

[Equation 17]

$$Q_2 = -|r_{sp}||E_{prob}||E_{ref}| \sin(\theta_{sp}+\phi) \qquad (17)$$

[Equation 18]

$$I_3 = -|r_{ps}||E_{prob}||E_{ref}| \cos(\theta_{ps}+\phi) \qquad (18)$$

[Equation 19]

$$Q_3 = -|r_{ps}||E_{prob}||E_{ref}| \sin(\theta_{ps}+\phi) \qquad (19)$$

[Equation 20]

$$I_4 = |r_{ss}||E_{prob}||E_{ref}| \cos(\theta_{ss}+\phi) \qquad (20)$$

[Equation 21]

$$Q_4 = |r_{ss}||E_{prob}||E_{ref}| \sin(\theta_{ss}+\phi) \qquad (21)$$

The image generator 141 performs the calculation described by Equation 22 below to eight differential detection signals described by Equations 13, 15, and 16-21, thereby calculating a signal proportional to the Jones matrix of the sample 110.

[Equation 22]

$$\begin{pmatrix} \sqrt{I_1^2 + Q_1^2} \tan^{-1}(Q_1/I_1) & \sqrt{I_3^2 + Q_3^2} \tan^{-1}(Q_3/I_3) \\ -\sqrt{I_2^2 + Q_2^2} \tan^{-1}(Q_2/I_2) & -\sqrt{I_4^2 + Q_4^2} \tan^{-1}(Q_4/I_4) \end{pmatrix} = \qquad (22)$$
$$\begin{pmatrix} r_{pp} & r_{ps} \\ r_{sp} & r_{ss} \end{pmatrix} |E_{prob}||E_{ref}|e^{i\phi}$$

Embodiment 1 Summary

The optical image measurement apparatus according to the embodiment 1: generates the first and the second measurement light with different polarization states using the beam displacer 104, the beam displacer 104 being a passive optical element; and irradiates these measurement light alternately using the light shielding element 105 (irradiation time controller). Accordingly, it is possible to calculate the Jones matrix of the sample 110 by fewer scan (one scan) than conventional techniques without using large and expensive polarization modulation elements.

Embodiment 2

Figure 4:
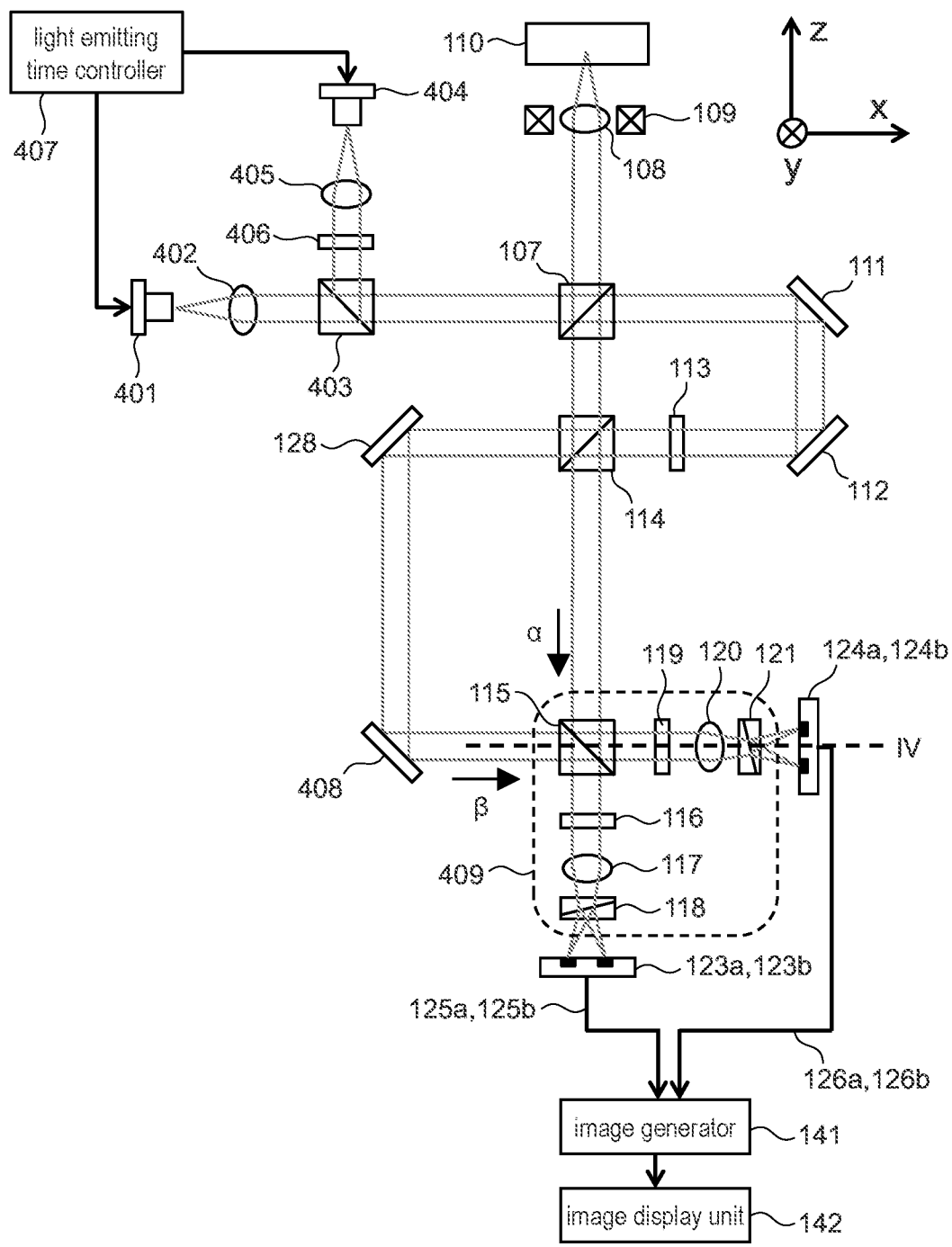
FIG. 4 is a schematic diagram illustrating a configuration example of the optical image measurement apparatus according to an embodiment 2.

FIG. 4 is a schematic diagram of a configuration example of the optical image measurement apparatus according to an embodiment 2 of the present disclosure. Same reference signs are assigned to same components as in FIG. 1, and explanations thereof will be omitted. The optical image measurement apparatus according to the embodiment 2 is different from the embodiment 1 in that two different light sources are employed. Further, the embodiment 2 is different from the embodiment 1 in that a single interference optical system is used to detect each measurement light. Other configurations are generally same as in the embodiment 1. Thus the differences will be mainly described below.

The first laser light in P polarization state emitted from the first light source 401 is converted into parallel light by a collimate lens 402. The parallel light enters a polarization beam splitter 403. The second laser light in P polarization state emitted from a second light source 404 is converted into parallel light by a collimate lens 405. The polarization state of the parallel light is converted into S polarization state by a λ/2 plate 406 whose optical axis is set at approximately 45 degree with respect to the horizontal direction. Then the second laser light enters the polarization beam splitter 403. The first and the second laser light are multiplexed by the polarization beam splitter 403. The multiplexed light enters the half beam splitter 107. The polarization beam splitter 403 is a passive optical element.

A light emitting time controller 407 controls the first light source 401 and the second light source 404 to emit light periodically and alternately. Specifically, similar to the shielding time by the light shielding element 105 in the embodiment 1, the light emitting time controller 407 switches whether the first light source 401 or the second light source 404 emits light at least once while the focus position of the objective lens 108 moves a distance corresponding to one pixel (a time period of ½N$f_{sig}$ in average). In other words, the first and the second light sources emit light alternately at a frequency at least equal to or above 2N$f_{sig}$. Accordingly, it is possible to irradiate the first and the second measurement light onto the sample while the focus position of the objective lens 108 moves by one pixel. Therefore, it is possible to sample signals that are sufficient to generate an image with N pixels for each of the first and the second measurement light. In addition, by controlling the light emitting timing of each of two light sources, it is possible to rapidly control irradiation timings of the first and the measurement light with simpler configuration than using the light shielding element 105 as in the embodiment 1.

Figure 5:
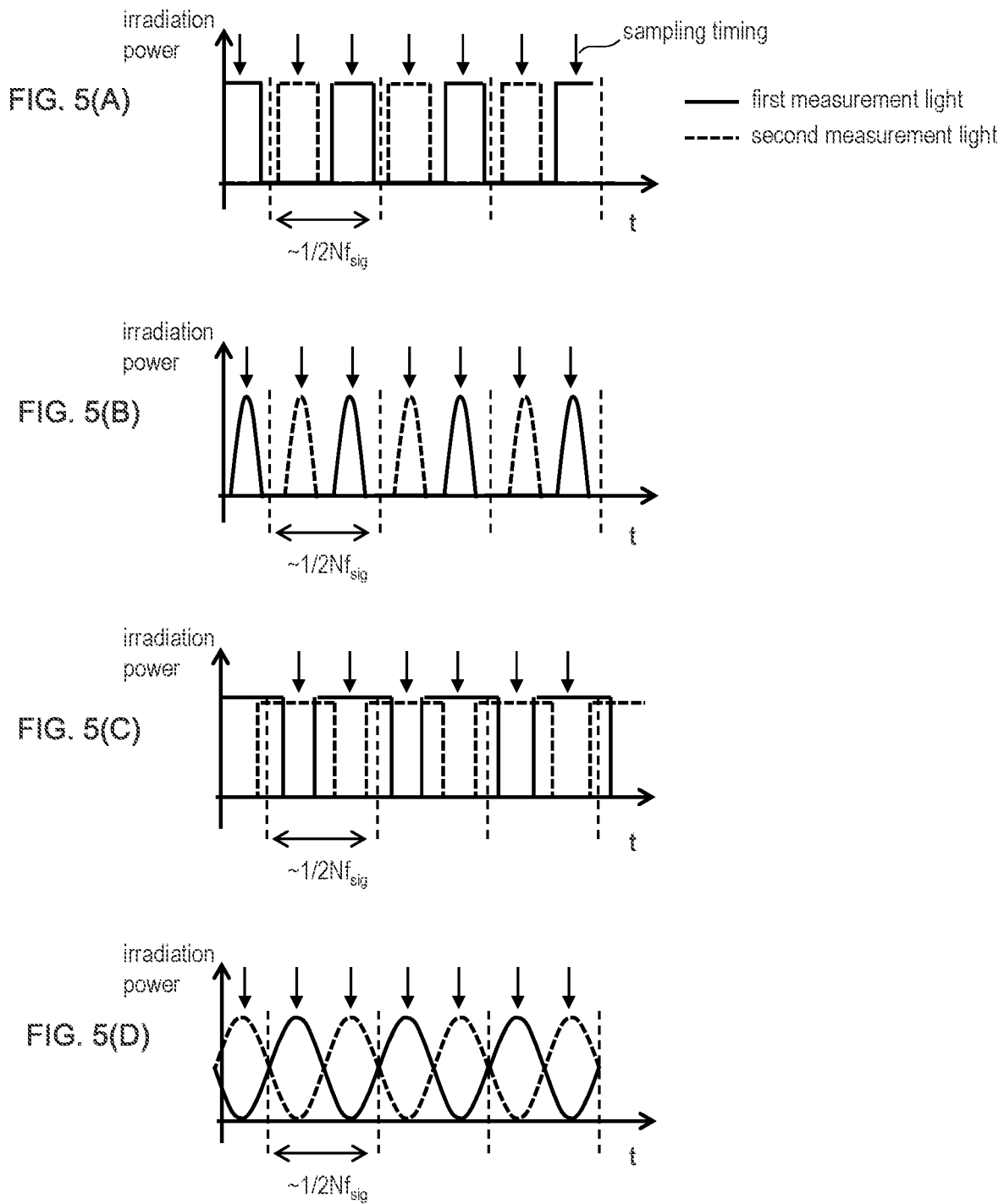
FIG. 5(a)-FIG. 5(d) are diagrams illustrating an example of timing at which the first and the second measurement light are irradiated onto a sample 110.

FIG. 5(*a*)-FIG. 5(*d*) are diagrams illustrating an example of timing at which the first and the second measurement light are irradiated onto the sample 110. The irradiation timing may be any timing as long as the first and the second measurement light are irradiated onto the sample 110 at least once while the focus position of the objective lens 108 moves by one pixel. As shown in FIG. 5 (*a*), the first and the second measurement light may be each irradiated once while the focus position of the objective lens 108 moves by one pixel. The waveform of the measurement light is not limited to square wave as shown in FIG. 5 (*a*). The measurement light may be upper half of a sine curve as shown in FIG. 5 (*b*). Such waveform is acquired by using a laser diode as the light source and by driving the laser diode with a sine curve current whose center value is at light emitting threshold current. In this case, as shown with the arrow mark in the figure, it is preferable to sample the signal at timings when the power of the measurement light is maximum. Other examples are shown in FIG. 5 (*c*) (*d*) where the timings at which the first and the second measurement light are irradiated overlap with each other. In this case, as shown with the arrow mark in the figure, it is preferable to sample the signal at the timing when any one of the measurement light is not being irradiated (or at the timing when the irradiation power is sufficiently small).

If the frequency at which the first light source 401 and the second light source 404 emit light alternately is increased too much, it is necessary for the light sources, the light emitting time controller 407, and the optical detectors 123, 124, 137, and 138 to have high capabilities (rapidity). Thus the cost is increased. Accordingly, it is preferable that the frequency at which the first light source 401 and the second light source 404 emit light alternately is not unnecessarily increased. For example, the frequency is preferably within the range of approximately 2N$f_{sig}$ to 4N$f_{sig}$. In typical values of $f_{sig}$=100 Hz and N=1000, the frequency range preferable for the light sources to emit light alternately is 200 kHz-400 kHz. This range is readily achieved by general laser drivers.

The process from when the first and the second laser light enter the half beam splitter 107 to when the first to fourth multiplexed light are generated is same as in the embodiment 1. Thus descriptions for these process will be omitted.

The first multiplexed light enters an interference optical system 409 from the direction shown by the arrow α, and then is converted into four interference light as in the embodiment 1. Current differential optical detectors 123*a* and 124*a* detect these interference light to generate signals 125*a* and 126*a*. The second multiplexed light enters the interference optical system 409 from the direction shown by the arrow β, and then is converted into four interference light. Current differential optical detectors 123*b* and 124*b* detect these interference light to generate signals 125*b* and 126*b*.

Figure 6:
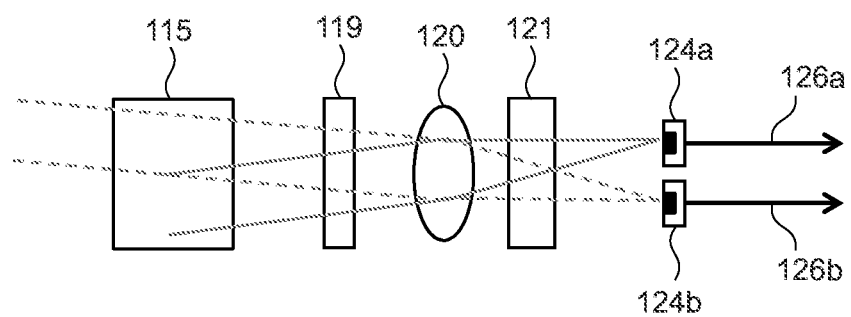
FIG. 6 is a sectional diagram of an interference optical system 409 in a linear line IV shown in FIG. 4.

FIG. 6 is a sectional view of the interference optical system 409 in the linear line IV shown in FIG. 4. The incident angle of the first multiplexed light and the incident angle of the second multiplexed light to the interference optical system 409 are inclined to the direction perpendicular to the paper surface. Since the angle of the first multiplexed light (solid line) is relatively inclined to the angle of the second multiplexed light (dotted line), it is possible to generate four interference light from the first and the second multiplexed light using the single interference optical system 409, and to detect these interference light by different detectors. Accordingly, it is not necessary to provide two interference optical systems, thereby decreasing the size and cost of the optical image measurement apparatus.

The third and the fourth multiplexed light are each converted into four interference light by the interference optical system 409 as in the first and the second multiplexed light, and then detected. The method for processing the signals 125*a*, 125*b*, 126*a*, and 126*b* outputted from the detectors is same as the method for the signals 125, 126, 139, and 140 in the embodiment 1.

Embodiment 3

Figure 7:
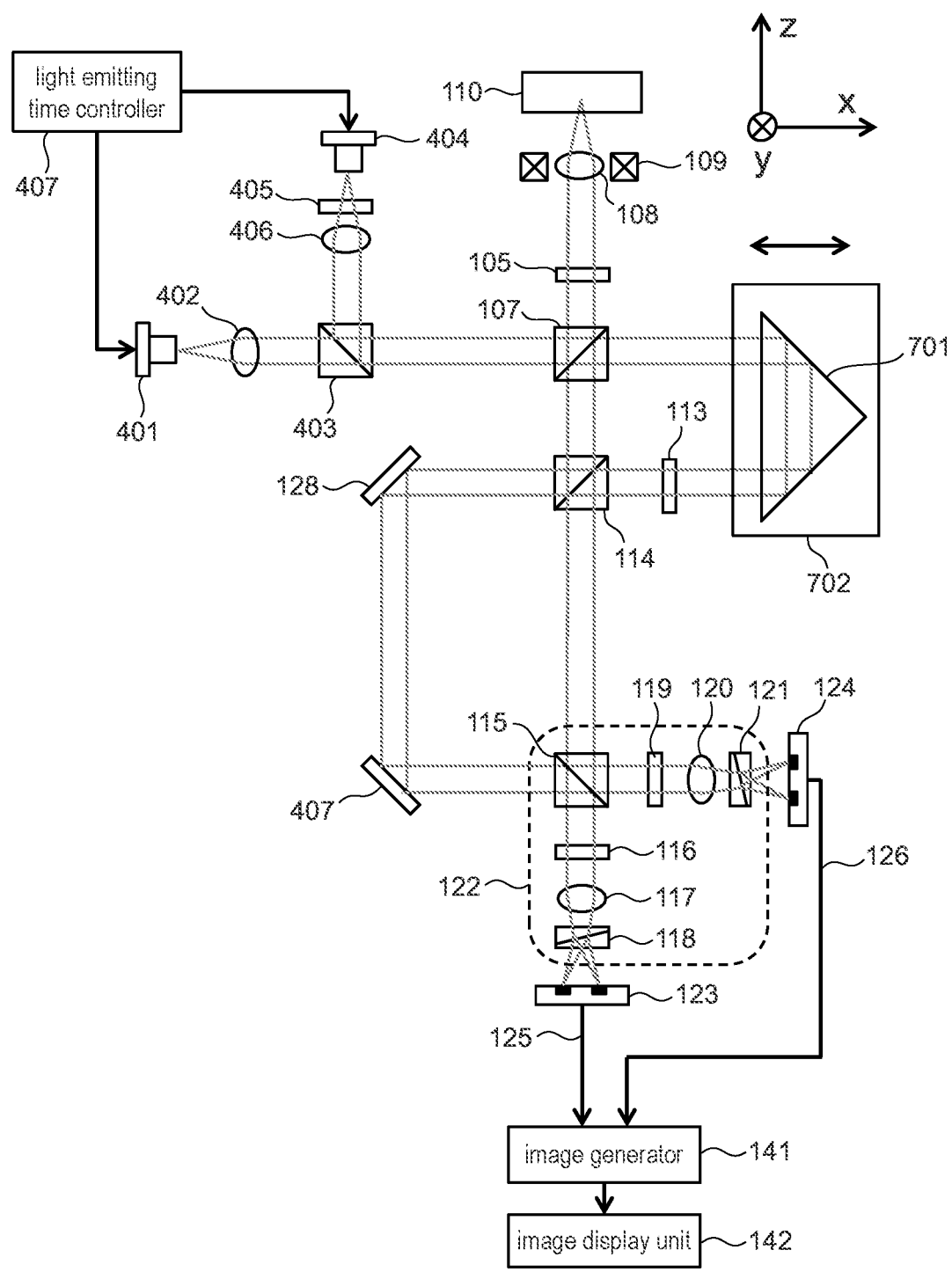
FIG. 7 is a schematic diagram illustrating a configuration example of an optical image measurement apparatus according to embodiment 3.

FIG. 7 is a schematic diagram illustrating a configuration example of the optical image measurement apparatus according to an embodiment 3 of the present disclosure. Same reference signs are assigned to same components, and descriptions thereof will be omitted. The optical image measurement apparatus according to the embodiment 3 is configured as a time domain OCT. The embodiment 3 is different from the embodiment 2 in that: the light emitted from the first light source 401 and from the second light source 404 is broadband light; and the apparatus includes means for adjusting the optical path length of the reference light. Other configurations are generally same as in the embodiment 2. Thus the differences will be mainly described below.

The first and the second broadband light emitted from the first light source 401 and from the second light source 404 enter the half beam splitter 107 as in the embodiment 2. Then the first and the second measurement light and the first and the second reference light are generated. The first and the second measurement light are reflected by the sample 110, and then the first and the second signal light are generated to be guided to the polarization beam splitter 114. The first and the second reference light are reflected by a perpendicular prism mirror 701. The polarizations of the first and the second reference light are respectively converted into 45 degree linear polarization and −45 degree linear polarization by the λ/2 plate 113 whose optical axis is at approximately 22.5 degree with respect to the horizontal direction. The first and the second reference light are then guided to the polarization beam splitter 114. The perpendicular prism mirror 701 is installed on a stage 702. It is possible to adjust the optical path length of the first and the second reference light by moving the stage 702 in the optical axis direction.

In this configuration, by utilizing characteristics of broadband light where only the reflected light component whose optical path length is identical to that of the reference light selectively interferes with the reference light, it is possible to achieve high spatial resolution in the optical axis direction. Because of using such theory, the measured position in the depth length is adjusted by changing the optical path length of the reference light using the stage 702. The spatial resolution in the optical axis direction is determined only by the coherence length of the broadband light, which is typically about 10 μm. In other words, the resolution in the optical axis direction in the embodiment 3 does not depend on the numerical aperture of the objective lens 108. Thus in contrast to the embodiments 1-2, it is not necessary to use the objective lens 108 with high NA so as to increase the resolution in the optical axis direction. Accordingly, it is possible to use the objective lens 108 with long working distance, thereby improving simplicity of measurement.

Embodiment 4

Figure 8:
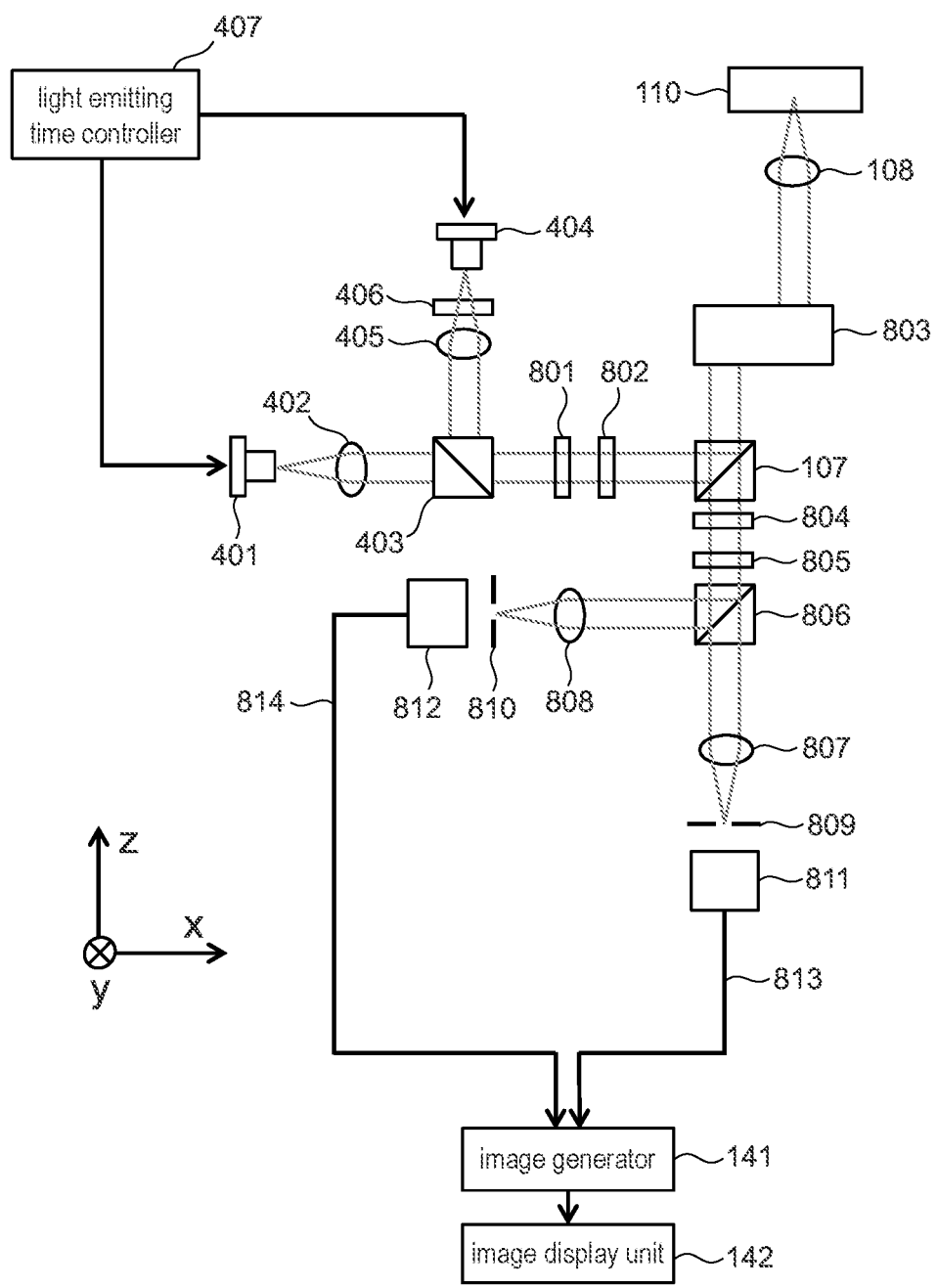
FIG. 8 is a schematic diagram illustrating a configuration example of an optical image measurement apparatus according to embodiment 4.

FIG. 8 is a schematic diagram illustrating a configuration example of the optical image measurement apparatus according to an embodiment 4 of the present disclosure. Same reference signs are assigned to same components, and descriptions thereof will be omitted. The optical image measurement apparatus according to the embodiment 4 is configured as confocal microscope.

The first laser light in P polarization state emitted from the first light source 401 is converted into parallel light by the collimate lens 402. The parallel light enters the polarization beam splitter 403. The second laser light in P polarization state emitted from the second light source 402 is converted into parallel light by the collimate lens 405. The second laser light is converted into S polarization state by the λ/2 plate 406 whose optical axis is set at approximately 45 degree with respect to the horizontal direction. Then the second laser light enters the polarization beam splitter 403. The first and the second laser light are multiplexed with each other by the polarization beam splitter 403. The polarization state of the multiplexed light is adjusted by a λ/2 plate 801 and by a λ/4 plate 802 whose crystal axis directions are rotationally adjustable. Then the multiplexed light enters the half beam splitter 107. The first and the second laser light reflected by the half beam splitter 107 passes through a scanning optical system 803, and then the first and the second measurement light are generated. The first and the second measurement light are focused and irradiated by the objective lens 108 onto the sample 110. The irradiation position of the first and the second measurement light onto the sample 110 is two dimensionally scanned by controlling the inclination of the optical axis using the scanning optical system 803. Two Galvano mirrors may be used as the scanning optical system 803.

The first and the second signal light acquired by the sample 110 reflecting the first and the second measurement light pass through the objective lens 108, the scanning optical system 803, and the half beam splitter 107. Then the polarization states of the first and the second signal light are adjusted by a λ/2 plate 804 and by a λ/4 plate 805 whose crystal axis directions are rotationally adjustable. Then the polarization of the first and the second signal light are divided into P polarization component and S polarization component.

The P polarization components of the first and the second signal light are focused by a focus lens 807. A detector 811 detects components that transmit a pin hole 809 arranged at the focus position of the focus lens 807, and then generates a detection signal 813. Similarly, the S polarization components of the first and the second signal light are focused by a focus lens 808. A detector 812 detects components that transmit a pin hole 810 arranged at the focus position of the focus lens 808, and then generates a detection signal 814. The image generator 141 generates an image reflecting reflectance or birefringence of the sample 110 according to the detection signals 813 and 814. The image display unit 142 displays the image.

The embodiment 4 performs up to four times of measurement (each referred to as first measurement to fourth measurement), thereby acquiring the Jones matrix of the sample. Hereinafter, operation theory and effect of the embodiment 4 will be described in details using equations. It is assumed that the Jones vectors of the first and the second laser light before entering the λ/2 plate 801 are described by Equations 23 and 24 below.

[Equation 23]

$$E_{prob,1} = \sqrt{2}\begin{pmatrix} E_{prob} \\ 0 \end{pmatrix} \quad (23)$$

[Equation 24]

$$E_{prob,2} = \sqrt{2}\begin{pmatrix} 0 \\ E_{prob} \end{pmatrix} \quad (24)$$

In the first measurement, the angle of the crystal axis direction of the λ/2 plate 801 is at 0 degree, the angle of the crystal axis direction of the λ/4 plate 802 is at 22.5 degree, the angle of the crystal axis direction of the λ/2 plate 804 is at 0 degree, and the angle of the crystal axis direction of the λ/4 plate 805 is at 0 degree. At this time, the Jones vectors of the first and the second measurement light irradiated onto the sample 110 are described by Equations 25 and 26 respectively below. The first measurement light is in 45 degree linear polarization, and the second measurement light is in −45 degree linear polarization.

[Equation 25]

$$\begin{pmatrix} 1/\sqrt{2} & 1/\sqrt{2} \\ 1/\sqrt{2} & -1/\sqrt{2} \end{pmatrix} \begin{pmatrix} e^{i\pi/4} & 0 \\ 0 & e^{-i\pi/4} \end{pmatrix} \begin{pmatrix} E_{prob} \\ 0 \end{pmatrix} = \frac{e^{i\pi/4}}{\sqrt{2}} \begin{pmatrix} 1 \\ 1 \end{pmatrix} E_{prob} \quad (25)$$

[Equation 26]

$$\begin{pmatrix} 1/\sqrt{2} & 1/\sqrt{2} \\ 1/\sqrt{2} & -1/\sqrt{2} \end{pmatrix} \begin{pmatrix} e^{i\pi/4} & 0 \\ 0 & e^{-i\pi/4} \end{pmatrix} \begin{pmatrix} 0 \\ E_{prob} \end{pmatrix} = \frac{e^{-i\pi/4}}{\sqrt{2}} \begin{pmatrix} 1 \\ -1 \end{pmatrix} E_{prob} \quad (26)$$

The first and the second signal light are acquired by the sample 110 reflecting the first and the second measurement light described by Equations 25 and 26. The Jones vectors of the first and the second signal light after transmitting the λ/4 plate 805 are described by Equations 27 and 28 below. Note that phase factors are omitted that are not involved with polarization states and amplitudes.

[Equation 27]

$$E_{sig,1} = \frac{1}{2}\begin{pmatrix} e^{i\pi/4} & 0 \\ 0 & e^{-i\pi/4} \end{pmatrix}\begin{pmatrix} 1 & 0 \\ 0 & -1 \end{pmatrix}\begin{pmatrix} r_{pp} & r_{ps} \\ r_{sp} & r_{ss} \end{pmatrix}\begin{pmatrix} 1 \\ 1 \end{pmatrix} E_{prob} = \quad (27)$$
$$\frac{1}{2}\begin{pmatrix} e^{i\pi/4}(r_{pp} + r_{ps}) \\ -e^{-i\pi/4}(r_{sp} + r_{ss}) \end{pmatrix} E_{prob}$$

[Equation 28]

$$E_{sig,2} = \frac{1}{2}\begin{pmatrix} e^{i\pi/4} & 0 \\ 0 & e^{-i\pi/4} \end{pmatrix}\begin{pmatrix} 1 & 0 \\ 0 & -1 \end{pmatrix}\begin{pmatrix} r_{pp} & r_{ps} \\ r_{sp} & r_{ss} \end{pmatrix}\begin{pmatrix} 1 \\ -1 \end{pmatrix} E_{prob} = \quad (28)$$
$$\frac{1}{2}\begin{pmatrix} e^{i\pi/4}(r_{pp} - r_{ps}) \\ -e^{-i\pi/4}(r_{sp} - r_{ss}) \end{pmatrix} E_{prob}$$

Assuming that: the detection signals 813 corresponding to P polarization components of the first and the second signal light acquired by the first measurement are represented by $D^{(1)}_{1,p}$ and $D^{(1)}_{2,p}$; and the detection signals 813 corresponding to S polarization component of the first and the second signal light are represented by $D^{(1)}_{1,s}$ and $D^{(1)}_{2,s}$, these values are described by Equations 29-32 below.

[Equation 29]

$$D^{(1)}_{1,p} = \frac{1}{4}[|r_{pp}|^2 + |r_{ps}|^2 + 2|r_{pp}||r_{ps}|\cos(\theta_{pp} - \theta_{ps})]|E_{prob}|^2 \quad (29)$$

[Equation 30]

$$D^{(1)}_{2,p} = \frac{1}{4}[|r_{pp}|^2 + |r_{ps}|^2 - 2|r_{pp}||r_{ps}|\cos(\theta_{pp} - \theta_{ps})]|E_{prob}|^2 \quad (30)$$

[Equation 31]

$$D^{(1)}_{1,s} = \frac{1}{4}[|r_{sp}|^2 + |r_{ss}|^2 + 2|r_{sp}||r_{ss}|\cos(\theta_{sp} - \theta_{ss})]|E_{prob}|^2 \quad (31)$$

-continued

[Equation 32]

$$D^{(1)}_{2,s} = \frac{1}{4}[|r_{sp}|^2 + |r_{ss}|^2 - 2|r_{sp}||r_{ss}|\cos(\theta_{sp} - \theta_{ss})]|E_{prob}|^2 \quad (32)$$

In the second measurement, the angle of the crystal axis direction of the λ/2 plate 801 is at 0 degree, the angle of the crystal axis direction of the λ/4 plate 802 is at 45 degree, and the angle of the crystal axis direction of the λ/2 plate 804 is at 0 degree. At this time, the Jones vectors of the first and the second measurement light irradiated onto the sample 110 are described by Equations 33 and 34 below. The first measurement light is in right-handed circular polarization, and the second measurement light is in left-handed circular polarization.

[Equation 33]

$$\begin{pmatrix} 1 & 0 \\ 0 & -1 \end{pmatrix}\begin{pmatrix} 1/\sqrt{2} & i/\sqrt{2} \\ i/\sqrt{2} & 1/\sqrt{2} \end{pmatrix}\begin{pmatrix} E_{prob} \\ 0 \end{pmatrix} = \frac{1}{\sqrt{2}}\begin{pmatrix} 1 \\ -i \end{pmatrix} E_{prob} \quad (33)$$

[Equation 34]

$$\begin{pmatrix} 1 & 0 \\ 0 & -1 \end{pmatrix}\begin{pmatrix} 1/\sqrt{2} & i/\sqrt{2} \\ i/\sqrt{2} & 1/\sqrt{2} \end{pmatrix}\begin{pmatrix} 0 \\ E_{prob} \end{pmatrix} = \frac{i}{\sqrt{2}}\begin{pmatrix} 1 \\ i \end{pmatrix} E_{prob} \quad (34)$$

The first and the second signal light are acquired by the sample 110 reflecting the first and the second measurement light described by Equations 33 and 34. The Jones vectors of the first and the second signal light after transmitting the λ/4 plate 805 are described by Equations 35 and 36 below. Note that factors are omitted that are not involved with polarization states.

[Equation 35]

$$E_{sig,1} = \frac{1}{2}\begin{pmatrix} e^{i\pi/4} & 0 \\ 0 & e^{-i\pi/4} \end{pmatrix}\begin{pmatrix} 1 & 0 \\ 0 & -1 \end{pmatrix}\begin{pmatrix} r_{pp} & r_{ps} \\ r_{sp} & r_{ss} \end{pmatrix}\begin{pmatrix} 1 \\ -i \end{pmatrix} E_{prob} = \quad (35)$$
$$\frac{1}{2}\begin{pmatrix} e^{i\pi/4}(r_{pp} - ir_{ps}) \\ -e^{-i\pi/4}(r_{sp} - ir_{ss}) \end{pmatrix} E_{prob}$$

[Equation 36]

$$E_{sig,2} = \frac{1}{2}\begin{pmatrix} e^{i\pi/4} & 0 \\ 0 & e^{-i\pi/4} \end{pmatrix}\begin{pmatrix} 1 & 0 \\ 0 & -1 \end{pmatrix}\begin{pmatrix} r_{pp} & r_{ps} \\ r_{sp} & r_{ss} \end{pmatrix}\begin{pmatrix} 1 \\ i \end{pmatrix} E_{prob} = \quad (36)$$
$$\frac{1}{2}\begin{pmatrix} e^{i\pi/4}(r_{pp} + ir_{ps}) \\ -e^{-i\pi/4}(r_{sp} + ir_{ss}) \end{pmatrix} E_{prob}$$

Assuming that: the detection signals 813 corresponding to P polarization components of the first and the second signal light acquired by the second measurement are represented by $D^{(2)}_{1,p}$ and $D^{(2)}_{2,p}$; and the detection signals 813 corresponding to S polarization component of the first and the second signal light are represented by $D^{(2)}_{1,s}$ and $D^{(2)}_{2,s}$, these values are described by Equations 37-40 below.

[Equation 37]

$$D^{(2)}_{1,p} = \frac{1}{4}[|r_{pp}|^2 + |r_{ps}|^2 - 2|r_{pp}||r_{ps}|\sin(\theta_{pp} - \theta_{ps})]|E_{prob}|^2 \quad (37)$$

[Equation 38]

$$D^{(2)}_{2,p} = \frac{1}{4}[|r_{pp}|^2 + |r_{ps}|^2 + 2|r_{pp}||r_{ps}|\sin(\theta_{pp} - \theta_{ps})]|E_{prob}|^2 \tag{38}$$

[Equation 39]

$$D^{(2)}_{1,s} = \frac{1}{4}[|r_{sp}|^2 + |r_{ss}|^2 - 2|r_{sp}||r_{ss}|\sin(\theta_{sp} - \theta_{ss})]|E_{prob}|^2 \tag{39}$$

[Equation 40]

$$D^{(2)}_{2,s} = \frac{1}{4}[|r_{sp}|^2 + |r_{ss}|^2 + 2|r_{sp}||r_{ss}|\sin(\theta_{sp} - \theta_{ss})]|E_{prob}|^2 \tag{40}$$

In the third measurement, the angle of the crystal axis direction of the λ/2 plate 801 is at 0 degree, the angle of the crystal axis direction of the λ/4 plate 802 is at 0 degree, and the angle of the crystal axis direction of the λ/2 plate 804 is at 22.5 degree. At this time, the Jones vectors of the first and the second measurement light irradiated onto the sample 110 are described by Equations 41 and 42 below. The first measurement light is in P polarization, and the second measurement light is in S polarization.

[Equation 41]

$$\begin{pmatrix} 1 & 0 \\ 0 & -1 \end{pmatrix}\begin{pmatrix} e^{i\pi/4} & 0 \\ 0 & e^{-i\pi/4} \end{pmatrix}\begin{pmatrix} E_{prob} \\ 0 \end{pmatrix} = e^{i\pi/4}\begin{pmatrix} 1 \\ 0 \end{pmatrix}E_{prob} \tag{41}$$

[Equation 42]

$$\begin{pmatrix} 1 & 0 \\ 0 & -1 \end{pmatrix}\begin{pmatrix} e^{i\pi/4} & 0 \\ 0 & e^{-i\pi/4} \end{pmatrix}\begin{pmatrix} 0 \\ E_{prob} \end{pmatrix} = e^{-i\pi/4}\begin{pmatrix} 0 \\ 1 \end{pmatrix}E_{prob} \tag{42}$$

The first and the second signal light are acquired by the sample 110 reflecting the first and the second measurement light described by Equations 41 and 42. The Jones vectors of the first and the second signal light after transmitting the λ/2 plate 804 are described by Equations 43 and 44 below. Note that factors are omitted that are not involved with polarization states.

[Equation 43]

$$E_{sig,1} = \tag{43}$$

$$\frac{1}{\sqrt{2}}\begin{pmatrix} e^{i\pi/4} & 0 \\ 0 & e^{-i\pi/4} \end{pmatrix}\begin{pmatrix} 1/\sqrt{2} & 1/\sqrt{2} \\ 1/\sqrt{2} & -1/\sqrt{2} \end{pmatrix}\begin{pmatrix} r_{pp} & r_{ps} \\ r_{sp} & r_{ss} \end{pmatrix}\begin{pmatrix} 1 \\ 0 \end{pmatrix}E_{prob} =$$

$$\frac{1}{2}\begin{pmatrix} e^{i\pi/4}(r_{pp} + r_{sp}) \\ e^{-i\pi/4}(r_{pp} - r_{sp}) \end{pmatrix}E_{prob}$$

[Equation 44]

$$E_{sig,2} = \tag{44}$$

$$\frac{1}{\sqrt{2}}\begin{pmatrix} e^{i\pi/4} & 0 \\ 0 & e^{-i\pi/4} \end{pmatrix}\begin{pmatrix} 1/\sqrt{2} & 1/\sqrt{2} \\ 1/\sqrt{2} & -1/\sqrt{2} \end{pmatrix}\begin{pmatrix} r_{pp} & r_{ps} \\ r_{sp} & r_{ss} \end{pmatrix}\begin{pmatrix} 0 \\ 1 \end{pmatrix}E_{prob} =$$

$$\frac{1}{2}\begin{pmatrix} e^{i\pi/4}(r_{ps} + r_{ss}) \\ e^{-i\pi/4}(r_{ps} - r_{ss}) \end{pmatrix}E_{prob}$$

Assuming that: the detection signals 813 corresponding to P polarization components of the first and the second signal light acquired by the third measurement are represented by $D^{(3)}_{1,p}$ and $D^{(3)}_{2,p}$; and the detection signals 813 corresponding to S polarization component of the first and the second signal light are represented by $D^{(3)}_{1,s}$, and $D^{(3)}_{2,s}$, these values are described by Equations 45-48 below.

[Equation 45]

$$D^{(3)}_{1,p} = \frac{1}{4}[|r_{pp}|^2 + |r_{sp}|^2 + 2|r_{pp}||r_{sp}|\cos(\theta_{pp} - \theta_{sp})]|E_{prob}|^2 \tag{45}$$

[Equation 46]

$$D^{(3)}_{2,p} = \frac{1}{4}[|r_{ps}|^2 + |r_{ss}|^2 + 2|r_{ps}||r_{ss}|\cos(\theta_{ps} - \theta_{ss})]|E_{prob}|^2 \tag{46}$$

[Equation 47]

$$D^{(3)}_{1,s} = \frac{1}{4}[|r_{pp}|^2 + |r_{sp}|^2 - 2|r_{pp}||r_{sp}|\cos(\theta_{pp} - \theta_{sp})]|E_{prob}|^2 \tag{47}$$

[Equation 48]

$$D^{(3)}_{2,s} = \frac{1}{4}[|r_{ps}|^2 + |r_{ss}|^2 - 2|r_{ps}||r_{ss}|\cos(\theta_{ps} - \theta_{ss})]|E_{prob}|^2 \tag{48}$$

In the fourth measurement, the angle of the crystal axis direction of the λ/2 plate 801 is at 0 degree, the angle of the crystal axis direction of the λ/4 plate 802 is at 0 degree, and the angle of the crystal axis direction of the λ/2 plate 804 is at 22.5 degree. At this time, the Jones vectors of the first and the second measurement light irradiated onto the sample 110 are described by Equations 49 and 50 below. The first measurement light is in P polarization, and the second measurement light is in S polarization.

[Equation 49]

$$\begin{pmatrix} 1 & 0 \\ 0 & -1 \end{pmatrix}\begin{pmatrix} e^{i\pi/4} & 0 \\ 0 & e^{-i\pi/4} \end{pmatrix}\begin{pmatrix} E_{prob} \\ 0 \end{pmatrix} = e^{i\pi/4}\begin{pmatrix} 1 \\ 0 \end{pmatrix}E_{prob} \tag{49}$$

[Equation 50]

$$\begin{pmatrix} 1 & 0 \\ 0 & -1 \end{pmatrix}\begin{pmatrix} e^{i\pi/4} & 0 \\ 0 & e^{-i\pi/4} \end{pmatrix}\begin{pmatrix} 0 \\ E_{prob} \end{pmatrix} = e^{-i\pi/4}\begin{pmatrix} 0 \\ 1 \end{pmatrix}E_{prob} \tag{50}$$

The first and the second signal light are acquired by the sample 110 reflecting the first and the second measurement light described by Equations 49 and 50. The Jones vectors of the first and the second signal light after transmitting the λ/2 plate 804 are described by Equations 51 and 52 below. Note that factors are omitted that are not involved with polarization states.

[Equation 51]

$$E_{sig,1} = \frac{1}{\sqrt{2}}\begin{pmatrix} 1/\sqrt{2} & i/\sqrt{2} \\ i/\sqrt{2} & 1/\sqrt{2} \end{pmatrix}\begin{pmatrix} 1 & 0 \\ 0 & -1 \end{pmatrix}\begin{pmatrix} r_{pp} & r_{ps} \\ r_{sp} & r_{ss} \end{pmatrix}\begin{pmatrix} 1 \\ 0 \end{pmatrix}E_{prob} = \tag{51}$$

$$\frac{1}{2}\begin{pmatrix} r_{pp} - ir_{sp} \\ ir_{pp} - r_{sp} \end{pmatrix}E_{prob}$$

-continued

[Equation 52]

$$E_{sig,2} = \frac{1}{\sqrt{2}} \begin{pmatrix} 1/\sqrt{2} & i/\sqrt{2} \\ i/\sqrt{2} & 1/\sqrt{2} \end{pmatrix} \begin{pmatrix} 1 & 0 \\ 0 & -1 \end{pmatrix} \begin{pmatrix} r_{pp} & r_{ps} \\ r_{sp} & r_{ss} \end{pmatrix} \begin{pmatrix} 0 \\ 1 \end{pmatrix} E_{prob} = \frac{1}{2} \begin{pmatrix} r_{ps} - ir_{ss} \\ ir_{ps} - r_{ss} \end{pmatrix} E_{prob}$$ (52)

Assuming that: the detection signals 813 corresponding to P polarization components of the first and the second signal light acquired by the fourth measurement are represented by $D^{(4)}_{1,p}$ and $D^{(4)}_{2,p}$; and the detection signals 813 corresponding to S polarization component of the first and the second signal light are represented by $D^{(4)}_{1,s}$, and $D^{(4)}_{2,s}$, these values are described by Equations 53-56 below.

[Equation 53]

$$D^{(4)}_{1,p} = \frac{1}{4}[|r_{pp}|^2 + |r_{sp}|^2 - 2|r_{pp}||r_{sp}|\sin(\theta_{pp} - \theta_{sp})]|E_{prob}|^2$$ (53)

[Equation 54]

$$D^{(4)}_{2,p} = \frac{1}{4}[|r_{ps}|^2 + |r_{ss}|^2 - 2|r_{ps}||r_{ss}|\sin(\theta_{ps} - \theta_{ss})]|E_{prob}|^2$$ (54)

[Equation 55]

$$D^{(4)}_{1,s} = \frac{1}{4}[|r_{pp}|^2 + |r_{sp}|^2 + 2|r_{pp}||r_{sp}|\sin(\theta_{pp} - \theta_{sp})]|E_{prob}|^2$$ (55)

[Equation 56]

$$D^{(4)}_{2,s} = \frac{1}{4}[|r_{ps}|^2 + |r_{ss}|^2 + 2|r_{ps}||r_{ss}|\sin(\theta_{ps} - \theta_{ss})]|E_{prob}|^2$$ (56)

The image generator 141 performs calculations to the 16 signals described by Equations 29-32, 37-40, 45-48, and 53-56 as in the embodiment 1, thereby calculating Jones matrix of the sample 110.

Since the embodiment 4 does not use interference of light in contrast to the embodiments 1-3, it is possible to acquire Jones matrix of the sample 110 without adjusting optical axes or optical path lengths of the signal light and of the reference light for acquiring interference signals.

MODIFICATION OF THE PRESENT DISCLOSURE

The present disclosure is not limited to a form of the above-described embodiments, but also includes various modifications. The above embodiments have been described in detail for the purpose of easy explanation of the present disclosure, and are not necessarily limited to that provided with all the described configurations. Moreover, a part of a configuration of one embodiment can be replaced with a configuration of another embodiment. Further, a configuration of one embodiment can be added with a configuration of another embodiment. Furthermore, a part of a configuration of each embodiment can be added, deleted, or replaced with another configuration.

DESCRIPTION OF SYMBOLS

101: light source
102: collimate lens
103, 113, 116, 130: λ/2 plate
104, 106: beam displacer
105: light shielding element
107, 115, 129: half beam splitter
108: objective lens
109: objective lens actuator
110: sample
111, 112, 128: mirror
114: polarization beam splitter
119, 133: λ/4 plate
117, 120, 131, 134: focus lens
118, 121, 132, 135: Wollaston prism
122: first interference optical system
123, 124, 137, 138: current differential optical detector
136: second interference optical system
141: image generator
142: image display unit

What is claimed is:

1. An optical image measurement apparatus comprising:
a light source that emits light;
a light irradiator that irradiates, using light emitted from the light source, first laser light in a first polarization state and second laser light in a second polarization state;
a half beam splitter that divides the first laser light into first measurement light and first reference light and divides the second laser light into second measurement light and second reference light;
an irradiation time controller that adjusts a time when the first measurement light is irradiated onto a sample at a first time and that adjusts a time when the second measurement light is irradiated onto the sample at a second time which is different from the first time;
an optical detector that detects first and second signal light acquired from the sample reflecting or scattering the first and the second measurement light, and that outputs the detected first and the second signal light in a form of an electric signal;
a polarization splitter that multiplexes the first signal light with the first reference light to generate first and second multiplexed light, and that multiplexes the second signal light with the second reference light to generate third and fourth multiplexed light; and
an interference optical system,
wherein the light irradiator generates the second laser light using a passive optical element that generates light in the second polarization state which is different from the first polarization state, and
wherein the interference optical system is configured so that an angle at which the first multiplexed light enters the interference optical system is different from an angle at which the second multiplexed light enters the interference optical system, and is configured so that an angle at which the third multiplexed light enters the interference optical system is different from an angle at which the fourth multiplexed light enters the interference optical system.

2. The optical image measurement apparatus according to claim 1,
wherein the light source comprises a first light source and a second light source,
wherein the first measurement light from the first light source is irradiated onto the sample, and the second measurement light from the second light source is irradiated onto the sample, and
wherein the irradiation time controller controls a time when the first light source emits light and a time when the second light source emits light, thereby adjusting the first time at which the first measurement light is irradiated on the sample and the second time at which the second measurement light is irradiated on the sample.

3. The optical image measurement apparatus according to claim 1,
wherein the interference optical system multiplexes the first signal light with the first reference light to generate three or more of interference lights whose phases are different from each other, and that multiplexes the second signal light with the second reference light to generate three or more of interference lights whose phases are different from each other, and
wherein the optical detector detects the interference light and outputs the detected interference light in a form of an electric signal.

4. The optical image measurement apparatus according to claim 1,
wherein the optical irradiator repeatedly scans the first and the second measurement light in a certain direction, and
wherein assuming that a number of pixels of an image of the sample in the certain direction is N, the irradiation time controller adjusts the first and the second time so that an operation irradiating the first measurement light onto the sample and an operation irradiating the second measurement light onto the sample switch between each other at a frequency equal to or above 2N times of a frequency at which the light irradiator scans the first and the second measurement light.

5. The optical image measurement apparatus according to claim 1,
wherein the optical irradiator repeatedly scans the first and the second measurement light in a certain direction, and
wherein assuming that a number of pixels of an image of the sample in the certain direction is N, the irradiation time controller adjusts the first and the second time so that an operation irradiating the first measurement light onto the sample and an operation irradiating the second measurement light onto the sample switch between each other at a frequency equal to or above 2N times and equal to or below 4N times of a frequency at which the light irradiator scans the first and the second measurement light.

6. The optical image measurement apparatus according to claim 1,
wherein a polarization state of the first measurement light is perpendicular to a polarization state of the second measurement light.

7. The optical image measurement apparatus according to claim 1,
wherein the light irradiator comprises a first optical path through which the first laser light passes, and a second optical path through which the second laser light passes and is different from the first optical path.

8. The optical image measurement apparatus according to claim 1,
wherein the optical detector detects the first signal light at the first time, and detects the second signal light at the second time.

9. An optical image measurement method comprising:
a step in which a light source emits light;
a light irradiating step of irradiating, using light emitted from the light source, first laser light in a first polarization state and second laser light in a second polarization state;
dividing the first laser light into first measurement light and first reference light and divides the second laser light into second measurement light and second reference light;
an irradiation time controlling step of adjusting a time when the first measurement light is irradiated onto a sample at a first time and of adjusting a time when the second measurement light is irradiated onto the sample at a second time which is different from the first time;
an optical detecting step of detecting first and second signal light acquired from the sample reflecting or scattering the first and the second measurement light, and of outputting the detected first and the second signal light as an electric signal;
multiplexing the first signal light with the first reference light to generate first and second multiplexed light, and that multiplexes the second signal light with the second reference light to generate third and fourth multiplexed light,
wherein the light irradiating step includes generating the second laser light using a passive optical element that generates light in the second polarization state which is different from the first polarization state, and
an angle at which the first multiplexed light enters an interference optical system is different from an angle at which the second multiplexed light enters the interference optical system, and is configured so that an angle at which the third multiplexed light enters the interference optical system is different from an angle at which the fourth multiplexed light enters the interference optical system.

* * * * *